Figure 1:
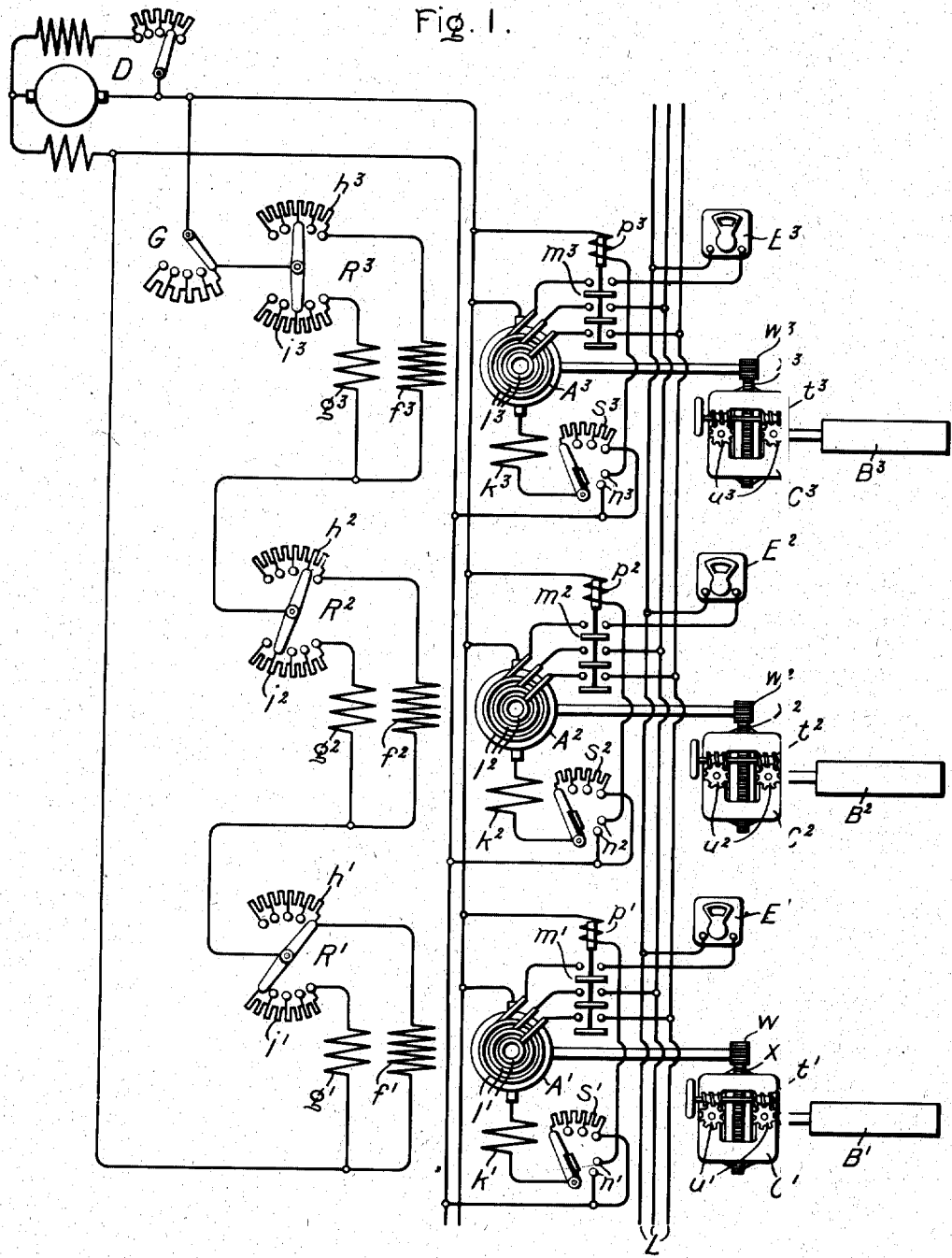

UNITED STATES PATENT OFFICE.

ROBERT H. ROGERS, OF SCHENECTADY, NEW YORK, ASSIGNOR TO GENERAL ELECTRIC COMPANY, A CORPORATION OF NEW YORK.

ELECTRIC-MOTOR DRIVE.

1,008,562.   Specification of Letters Patent.   Patented Nov. 14, 1911.

Continuation in part of application Serial No. 503,776, filed June 23, 1909. This application filed May 24, 1910. Serial No. 563,128.

*To all whom it may concern:*

Be it known that I, ROBERT H. ROGERS, a citizen of the United States, residing at Schenectady, county of Schenectady, State of New York, have invented certain new and useful Improvements in Electric-Motor Drives, of which the following is a specification.

This application is in part a continuation of my prior application, Serial No. 503,776, filed June 23, 1909.

My invention relates to individual electric motor drives, and more particularly to such drives for machines like paper-making machines, composed of parts each of which must be driven at a slightly different speed from another part, the different speeds bearing a fixed relation to each other.

In paper-making machines, the raw material or pulp is supplied to what is known as the "wet end" of the machine, where it is drawn out by suitable devices into a thin continuous sheet, which is saturated with water. This thin sheet is then conveyed to the succeeding parts of the machine which drives the moisture out of the pulp and forms it into paper. It will thus be seen that it is necessary to drive all parts of the machine at the proper speeds to prevent the sheet from breaking or sagging between the various parts. During the process of drying, the paper stretches or contracts in the different parts of the machine according to the grade of paper, and consequently each part must be driven at a slightly different speed from another part, and when the machine is once adjusted, the speeds of the different parts must bear a fixed relation to each other. In order to accomplish this, I provide each part of the machine with a separate direct-current motor, the field windings of which are connected in series across a suitable source and are proportioned so that the ampere turns of each field winding may be varied without changing the total resistance of each field winding, and consequently the current flowing through it. Properly designed motors, preferably commutating pole motors, are used so that any change in load likely to occur on any motor will not tend to change its speed perceptibly. Each motor may be directly connected to the part of the machine which it drives, in which case by means of my invention I am enabled to vary the speed of any individual motor without affecting the predetermined speeds of the other motors, or the several motors may be interconnected by synchronizing connections so that they will all be compelled to operate at the same speed and the individual speed regulation of the different parts of the machine obtained by speed changing gearing between the several motors and the parts which they drive. In the latter case my invention furnishes a simple and easily manipulated means for adjusting the motor field so as to reduce to a minimum the synchronizing currents flowing in the connections between the several motors.

When my invention is used the variation of the field of any individual motor will not affect the predetermined speeds at which the other motors tend to run because the resistance of the field circuit as a whole remains unchanged and since all the field windings are in series, temperature changes in one motor which affect the resistance of the field winding of that motor will be instantly reflected to the other motor fields, and thus any tendency to change in speed in one motor due to heating will be accompanied by a corresponding tendency in all the other motors. The relative speeds of the different motors or the synchronizing currents, if synchronizing connections are used, will thus be maintained at a constant value.

Other aspects of my invention consist in certain combinations and arrangements of parts, pointed out with particularity in the claims appended to and forming a part of this specification.

For a better understanding of my invention, reference may be had to the following description taken in connection with the accompanying drawings, in which—

Figure 2:
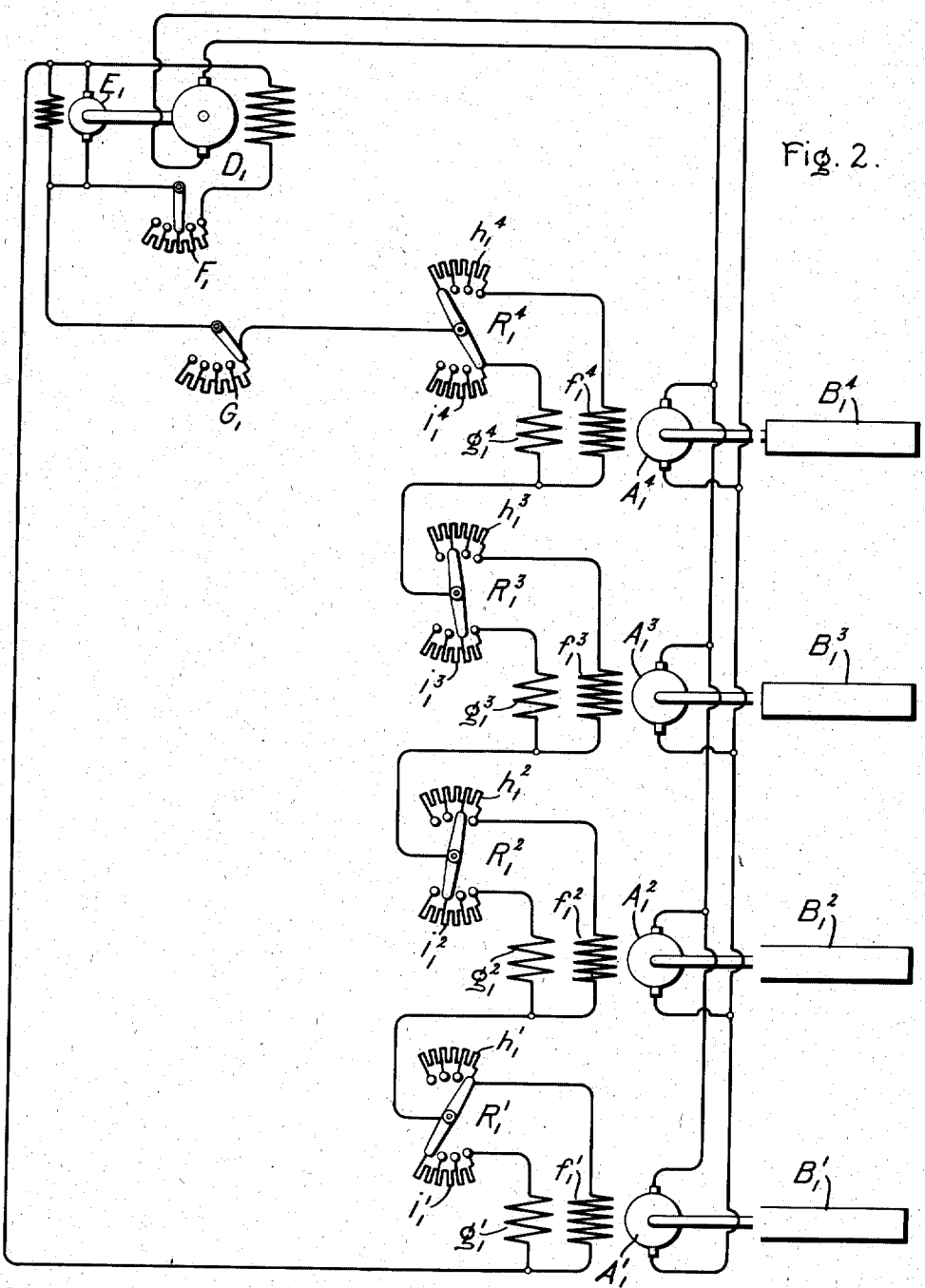

Figure 1 shows diagrammatically a paper-making machine provided with an electric drive in accordance with my invention, the motors having synchronizing connections and variable speed mechanisms between them and the parts of the machine; and Fig. 2 shows diagrammatically such a machine provided with an electric drive in accordance with my invention, the motors directly driving the individual parts of the machine.

Similar letters of reference throughout the specification and the several figures of the drawings refer to like parts.

Referring to Fig. 1 of the drawings, $A^1$, $A^2$ and $A^3$ are the armatures of direct current motors driving the parts $B^1$, $B^2$ and $B^3$ of a machine through the variable speed gearing $C^1$, $C^2$ and $C^3$. The direct current brushes of these armatures are connected in parallel to a suitable source of current, which I have chosen to illustrate as a compound wound generator D. The armatures $A^1$, $A^2$ and $A^3$ have synchronizing connections which will be hereafter explained. Each motor is provided with a field winding, the ampere turns of which may be varied without changing the total resistance of the field winding. I prefer to do this by dividing each winding into two parts, one of which has a greater number of turns than the other, connecting each part in series with a resistance and the two parts in parallel, and then varying the resistance in the two parts inversely so as to change the distribution of the current in the two parts, and consequently the total ampere turns, but leaving the total resistance of the field winding unchanged. $f^1$, $f^2$ and $f^3$ represent the parts of the winding having the greater number of turns, and $g^1$, $g^2$ and $g^3$ the parts having the less number of turns. $R^1$, $R^2$ and $R^3$ are rheostats having a series of resistances $h^1$, $h^2$ and $h^3$ in series with the parts $f^1$, $f^2$ and $f^3$ of the field windings, and series of resistances $i^1$, $i^2$ and $i^3$ in series with the parts of the winding $g^1$, $g^2$ and $g^3$ of the windings respectively. The movement of the rheostat handles on the different points of the rheostats varies inversely the resistances in series with the different parts of the field windings. The parts of the windings and the steps of the resistances are so proportioned that the total resistance of the field windings is constant for all adjustments of the rheostat, and therefore with a constant voltage applied, the total field current is the same. A simple way of arranging the resistances is to have the two parts of the field windings of the same resistance and to calculate, in the well known manner, the steps of the resistances in the rheostats so as to get the proportions mentioned above. The total field current divides up between the parts of the field windings according to the resistance in series therewith, and with the rheostat handle on different points, different field strengths may be obtained. All of these field windings are connected in series as shown on the drawing and are excited by the generator D. The motors are also preferably provided with auxiliary cumulatively wound series field windings $k^1$, $k^2$ and $k^3$. These series field windings give the motors a maximum field-strength when starting and are also useful in helping to keep the motors at the same speed when they are running. The synchronizing connections comprise collector rings $l^1$, $l^2$ and $l^3$ connected to busses L. I have shown each motor as provided with three collector rings but any number may be used. These synchronizing connections keep the motor armatures at the same speed, as is clearly explained in the patent to Thomson and Rice, No. 545,111, dated Aug. 27, 1895. The connections between the busses L and the collector rings of the motors are opened by means of contactors $m^1$, $m^2$ and $m^3$. In series with the direct current brushes of the armatures of the motors are starting rheostats $S^1$, $S^2$ and $S^3$. After the motors have started and the resistance of the starting rheostats has all been cut out, the handles of these rheostats close the set of contacts $n^1$, $n^2$ and $n^3$, which energize the coils $p^1$, $p^2$ and $p^3$ of the contactors, thus closing the synchronizing connections of the motors. Any of the well known methods of synchronizing may be employed to indicate the proper time to connect together the contacts $n^1$, $n^2$ and $n^3$. The total field current of all the motors, and consequently their speed may be changed by means of a master rheostat G.

Since each part of the paper machine must be driven at a slightly different speed from that of the other parts of the machine, and since the motors have synchronizing connections and therefore run at the same speed, it is necessary to employ the variable speed gears $C^1$, $C^2$ and $C^3$ between the parts of the machine and the armatures of the motors. A variable speed mechanism or gear of any type may be employed. I prefer, however, to use a variable speed gear, which comprises two wheels of different diameter one within the other, ratchet teeth being formed on the circumference of the smaller wheel and a number of pawls jointed to the inner circumference of the large wheel to engage the ratchet teeth, and means for raising and lowering the larger wheel so as to vary the distance between the axes of the two wheels so that as the wheels revolve each pawl comes in succession to a position in which it drives the smaller wheel faster than any of the other pawls and continues to so drive it until the next succeeding pawl comes to the position in which it in turn can drive faster. When the larger wheel is concentric with the smaller wheel the pawls do not drive and both wheels revolve at the same speed. As shown in Fig. 1 of the drawings, hand operated worms $t^1$, $t^2$ and $t^3$ and screws $u^1$, $u^2$ and $u^3$ are the means for raising and lowering the larger wheels $x^1$, $x^2$ and $x^3$, which have gear teeth on their outer peripheries engaging teeth on pinions $w^1$, $w^2$ and $w^3$ on the end of the motor shaft.

In case there is any exchange current between the various motors, as indicated on the meters $E^1$, $E^2$ or $E^3$ in the synchronizing connections, one of the rheostat handles $R^1$, $R^2$ or $R^3$ is shifted so that more or less current flows through that part of the field winding having the greatest number of turns, and thereby reduces this exchange current. I have shown the rheostats as being in different positions, so that the field winding of armature $A^1$ has the greatest number of ampere turns since the handle of rheostat $R^1$ is shifted so that more of the field current passes through the part $f^1$ of the field winding than through the part $g^1$. The handles of rheostats $R^2$ and $R^3$ are shifted so that the ampere turns of the field windings composed of the parts $f^2$ and $g^2$, and $f^3$ and $g^3$ are less than that of the field winding composed of the parts $f^1$ and $g^1$.

In Fig. 2 of the drawings, $A_1^{\ 1}$, $A_1^{\ 2}$, $A_1^{\ 3}$ and $A_1^{\ 4}$ are the armatures of direct current motors and drive the parts $B_1^{\ 1}$, $B_1^{\ 2}$, $B_1^{\ 3}$ and $B_1^{\ 4}$ of a machine. The armatures are connected in parallel to a suitable source of direct current which I have chosen to illustrate as a separately excited generator $D_1$. The field windings of these motors is divided as explained in connection with Fig. 1 into two parts, $f_1^{\ 1}$, $f_1^{\ 2}$, $f_1^{\ 3}$ and $f_1^{\ 4}$ being the parts having the greatest number of turns and $g_1^{\ 1}$, $g_1^{\ 2}$, $g_1^{\ 3}$ and $g_1^{\ 4}$, the parts having the less number of turns. $R_1^{\ 1}$, $R_1^{\ 2}$, $R_1^{\ 3}$ and $R_1^{\ 4}$ are rheostats having series of resistances $h_1^{\ 1}$, $h_1^{\ 2}$, $h_1^{\ 3}$ and $h_1^{\ 4}$ in series with the parts $f_1^{\ 1}$, $f_1^{\ 2}$, $f_1^{\ 3}$ and $f_1^{\ 4}$ of the field windings and series of resistances $i_1^{\ 1}$, $i_1^{\ 2}$, $i_1^{\ 3}$ and $i_1^{\ 4}$ in series with the parts $g_1^{\ 1}$, $g_1^{\ 2}$, $g_1^{\ 3}$ and $g_1^{\ 4}$ of the windings respectively.

All of the field windings are connected in series, as shown, and are excited by the exciter $E_1$, which also excites the field winding of the generator $D_1$, so that the current supplied the field windings of all the motors is the same. If all of the handles of the rheostats are in the same position, the speeds of all the motors will be the same, and in case the field winding of one machine heats up more than that of another, reducing the current in that field winding, the current in all of the field windings will be reduced by the same amount, since they are all in series. If it is desired to run the armatures at slightly different speeds from one another, the rheostat handles are shifted, so that more or less of the current flows through that part of the field winding having the greatest number of turns. As shown in this figure of the drawings, armature $A_1^{\ 1}$ runs at the slowest speed and armature $A_1^{\ 4}$ at the highest speed, since the field winding composed of the parts $f_1^{\ 1}$ and $g_1^{\ 1}$ has more ampere turns than that composed of the parts $f_1^{\ 2}$, $g_1^{\ 2}$, or $f_1^{\ 3}$, $g_1^{\ 3}$, or $f_1^{\ 4}$, $g_1^{\ 4}$. The speed of the machine as a whole, or in other words, the speed of all the motors may be controlled in any suitable manner. One method of control is by the well known "Ward Leonard" system, that is, by varying the value of the electromotive force of the generator $D_1$ supplying the armatures $A_1^{\ 1}$, $A_1^{\ 2}$, $A_1^{\ 3}$ and $A_1^{\ 4}$ of the motors including more or less of the resistance $F_1$ in circuit with its exciting windings. Another method of control is by means of a master rheostat $G_1$ in series with all of the field windings, whereby the total field current is changed. In this latter system, the generator $D_1$ is used as a constant potential machine and the resistance $F_1$ is not disturbed. With a master rheostat control, all of the motors must be designed to operate on the same point of the saturation curve, but with "Ward Leonard" control this is not necessary.

I have illustrated my invention in connection with a paper-making machine having four parts, but it is evident to those skilled in the art that it is not limited to any particular type of machine of any particular number of parts, and I aim in the appended claims to cover all modifications which do not depart from the spirit or scope of my invention.

What I claim as new and desire to secure by Letters Patent of the United States, is,—

1. In combination, a plurality of direct-current motors, means for supplying current thereto, field windings therefor connected in series, and means for varying the ampere turns of each field winding without changing the total resistance thereof.

2. In combination, a plurality of direct-current motors, means for supplying current thereto, the armatures of said motors being connected in parallel, field windings for said motors connected in series, and means for varying the ampere turns of each field winding without changing the total resistance thereof.

3. In combination, a plurality of direct-current motors, means for supplying current thereto, field windings therefor connected in series, each field winding being divided into two parts connected in parallel, one of said parts having a greater number of turns than the other, and resistances connected in series with each part.

4. In combination, a plurality of direct-current motors, means for supplying current thereto, field windings therefor connected in series, each field winding being divided into two parts connected in parallel, one of said parts having a greater number of turns than the other, resistances connected in series with each part, and means for varying said resistances inversely.

5. In combination, a plurality of direct-current motors, means for supplying current thereto, field windings therefor connected in series, and rheostats in each of said field windings, said field windings and rheostats being so proportioned that the ampere turns of each field winding may be varied and the total resistance of each winding will remain constant for all positions of the rheostat.

6. In combination, a plurality of direct-current motors, means for supplying current thereto, field windings therefor connected in series, each field winding being divided into two parts connected in parallel, one of said parts having a greater number of turns than the other, and rheostats having two sets of resistances, one set being in series with each part of said winding, the resistance of the parts of the winding and the sets of resistances being so proportioned that the total resistance of each winding is constant for all positions of the rheostat.

7. In an electric motor, a field winding divided into two parts connected in parallel, one of said parts having a greater number of turns than the other, and resistances connected in series with each part.

8. In an electric motor, a field winding divided into two parts connected in parallel, one of said parts having a greater number of turns than the other, resistances connected in series with each part, and means for varying said resistances inversely so that the total resistance of said field winding remains constant.

9. In an electric motor, a field winding divided into two parts connected in parallel, one of said parts having a greater number of turns than the other, and a rheostat having two sets of resistances, one set being in series with each part of said winding, the resistance of the parts of the winding and the sets of resistances being so proportioned that the total resistance of said winding remains constant.

10. In combination with a machine, a plurality of direct-current motors for driving the separate parts thereof, means for supplying current to said motors, variable speed gearing between the motors and the parts of the machine, synchronizing connections between the motors, and field windings for the motors connected in series and so proportioned that the ampere turns of each field winding may be varied without changing the resistance of each winding.

11. In combination with a machine, a plurality of direct-current motors for driving the separate parts thereof, means for supplying current to said motors, variable speed gearing between the motors and the parts of the machine, synchronizing connections between the motors, field windings for said motors connected in series, each field winding being divided into two parts connected in parallel, one of said parts having a greater number of turns than the other, and resistances connected in series with each part.

12. In combination with a machine, a plurality of direct-current motors for driving the separate parts thereof, means for supplying current to said motors, variable speed gearing between the motors and the parts of the machine, synchronizing connections between the motors, field windings for said motors connected in series, each field winding being divided into two parts connected in parallel, one of said parts having a greater number of turns than the other, resistances connected in series with each part, and means for varying said resistances inversely.

13. In combination with a machine, a plurality of direct-current motors for driving the separate parts thereof, means for supplying current to said motors, variable speed gearing between the motors and the parts of the machine, synchronizing connections between the motors, field windings therefor connected in series, and rheostats in each of said field windings, said field windings and rheostats being so proportioned that the ampere turns of each field winding may be varied and the total resistance of each winding will remain constant for all positoins of the rheostat.

14. In combination with a machine, a plurality of direct-current motors for driving the separate parts thereof, means for supplying current to said motors, variable speed gearing between the motors and the parts of the machine, synchronizing connections between the motors, field windings therefor connected in series, each field winding being divided into two parts connected in parallel, one of said parts having a greater number of turns than the other, and rheostats having two sets of resistances, one set being in series with each part of said winding, the resistance of the parts of the winding and the sets of resistances being so proportioned that the total resistance of each winding is constant for all positions of the rheostat.

15. In combination with a machine, a plurality of direct-current motors for driving the separate parts thereof, means for supplying current to said motors, variable speed gearing between the motors and the parts of the machine, synchronizing connections between the motors, field windings for said motors connected in series, each field winding being divided into two parts connected in parallel, one of said parts having a greater number of turns than the other, resistances connected in series with each part and auxiliary series field windings for said motors.

16. In combination with a machine, a plurality of direct-current motors for driving the separate parts thereof, means for supplying current to said motors, field windings for said motors, variable speed gearing between the motors and the parts of the machine, synchronizing connections between the motors, means in said synchronizing connections for indicating the exchange current between the motors, and means in series with said field windings for reducing the exchange current between the motors.

17. In combination with a machine, a plurality of direct-current motors for driving the separate parts thereof, means for supplying current to said motors, field windings for said motors, variable speed gearing between the motors and the parts of the machine, synchronizing connections between the motors, means in said synchronizing connections for indicating the exchange current between the motors means in series with said field windings for reducing the exchange current between the motors, and auxiliary series field windings for said motors.

In witness whereof, I have hereunto set my hand this 19th day of May, 1910.

ROBERT H. ROGERS.

Witnesses:
BENJAMIN B. HULL,
HELEN ORFORD.